(12) United States Patent
Chen et al.

(10) Patent No.: US 11,496,324 B2
(45) Date of Patent: Nov. 8, 2022

(54) ENFORCEABLE PSEUDONYMOUS REPUTATION THROUGH CHAINED ENDORSERS

(71) Applicant: Digital Trust Networks Inc., Santa Clara, CA (US)

(72) Inventors: Mark Chen, Newark, CA (US); Jason S. Burnett, San Jose, CA (US)

(73) Assignee: Digital Trust Networks Inc., Santa Clara, CA (US)

( * ) Notice: Subject to any disclaimer, the term of this patent is extended or adjusted under 35 U.S.C. 154(b) by 0 days.

(21) Appl. No.: 17/119,744

(22) Filed: Dec. 11, 2020

(65) Prior Publication Data

US 2021/0184866 A1 Jun. 17, 2021

Related U.S. Application Data

(60) Provisional application No. 62/949,094, filed on Dec. 17, 2019.

(51) Int. Cl.
*H04L 9/32* (2006.01)
*G06F 21/62* (2013.01)
*H04L 9/06* (2006.01)
*H04L 9/00* (2022.01)

(52) U.S. Cl.
CPC ........ *H04L 9/3265* (2013.01); *G06F 21/6227* (2013.01); *H04L 9/0643* (2013.01); *H04L 9/50* (2022.05)

(58) Field of Classification Search
CPC . H04L 9/3265; H04L 9/0643; H04L 2209/38; H04L 9/3247; H04L 2209/42; G06F 21/6227; G06F 21/6245
USPC ........................................................ 713/157
See application file for complete search history.

(56) References Cited

U.S. PATENT DOCUMENTS

| | | | |
|---|---|---|---|
| 2001/0042206 A1 | 11/2001 | Carro | |
| 2010/0333186 A1 | 12/2010 | Chan | |
| 2011/0302412 A1* | 12/2011 | Deng | H04L 63/0407 713/155 |
| 2016/0098682 A1* | 4/2016 | Tsyganskiy | G06Q 10/0633 705/320 |
| 2017/0279818 A1* | 9/2017 | Milazzo | H04L 63/1433 |
| 2019/0207951 A1* | 7/2019 | Oberhauser | H04L 9/3236 |
| 2020/0252202 A1* | 8/2020 | Madl | G06F 21/6218 |

* cited by examiner

*Primary Examiner* — Sanchit K Sarker
(74) *Attorney, Agent, or Firm* — Van Pelt, Yi & James LLP

(57) ABSTRACT

Techniques are disclosed to provide enforceable pseudonymous reputation through chained endorsers. In various embodiments, a request associated with a chained endorsement operation is received via a communication interface. A client identity information is extracted from the request. Data comprising or associated with the client identity information is combined with a secret value. A one-way transform of the combined value is performed. A result of the one-way transform is returned to a client with which the chained endorsement operation is associated.

19 Claims, 3 Drawing Sheets

ENFORCEABLE PSEUDONYMOUS REPUTATION THROUGH CHAINED ENDORSERS

CROSS REFERENCE TO OTHER APPLICATIONS

This application claims priority to U.S. Provisional Patent Application No. 62/949,094 entitled ENFORCEABLE PSEUDONYMOUS REPUTATION THROUGH CHAINED ENDORSERS filed Dec. 17, 2019 which is incorporated herein by reference for all purposes.

BACKGROUND OF THE INVENTION

It is generally feasible to track reputation for service accounts with positive reputation scores because the owners of those accounts have an incentive to maintain their score. Negative reputation, however, is quite difficult to track because under prior approaches owners of such accounts can simply register a new account and start afresh.

BRIEF DESCRIPTION OF THE DRAWINGS

Various embodiments of the invention are disclosed in the following detailed description and the accompanying drawings.

DETAILED DESCRIPTION

Figure 1:
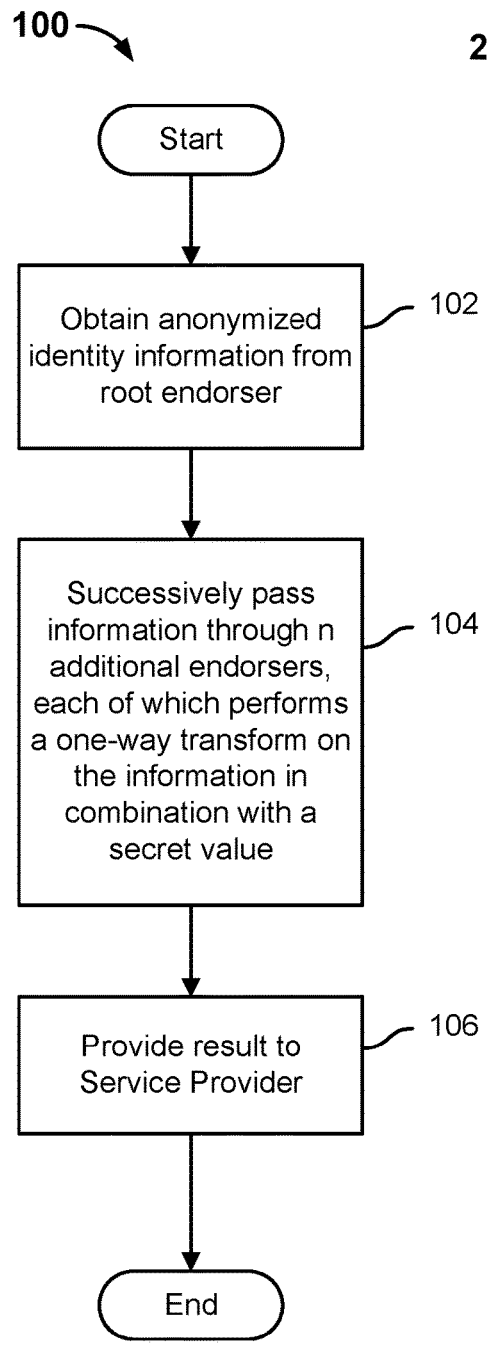
FIG. 1 is a flow diagram illustrating an embodiment of a process to register an account via a process that provides enforceable pseudonymous reputation across service accounts for the same user and service.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to provide enforceable pseudonymous reputation across service accounts for the same user and service. In various embodiments, service providers are able to maintain history for individual users (or clients) without compromising the users' privacy. Each user may register pseudonymously for an account, but if the user returns and registers another account, he or she will be recognized as the same user. Additionally, in some embodiments, if the user of one service provider registers for an account with a different service provider, only the user will know that the two accounts belong to the same individual.

In various embodiments, a reputation system/service as disclosed herein includes/provides one or more of the following features:

provides an enforceable pseudonymous reputation system; Clients need not reveal any personal information to Service Providers, yet each Client is recognizable by a unique and persistent identifier if a Client who has an existing (or previously existing) account with a Service Provider attempts to register a new account with the same Service Provider, the Service Provider will recognize that both accounts belong to the same Client Client's identifier and history with any Service Provider have no visible correlation to Client's identifier and history with any other Service Provider only the Client knows with which Service Providers the Client has accounts The following roles and terms are referenced in this disclosure, e.g., to describe various embodiments:

Client: an entity (for example, an individual user) seeking to register an account with the Service Provider.

Endorser: one member in a chain of linked entities, each of which binds some anonymized, Client-related information to a public key by means of a signature. In various embodiments, as described herein Endorsers are numbered 0 . . . n, where Endorser 0 (the Root Endorser) is the custodian of the Client's Personal Identifying Information. Each Endorser (except for the Root Endorser) knows the public key of the preceding Endorser and can thus verify its signature. The Root Endorser knows the Client's persistent public key.

Personal Identifying Information: immutable, globally unique value or set of values pertaining to the Client (for example, name, date of birth, SSN, etc.) and known only to Endorser 0 and, optionally, the Client. In various embodiments, this Personal Identifying Information need not contain the Client's personal information so long as it maps bijectively and immutably to a single individual.

Registration Identifier: immutable, protocol-generated identifier linking a single Client to a single Service Provider. This value is unique within the domain of the Service Provider.

Service Provider: entity with which the Client seeks to establish an account. The Service Provider knows the public key of the final Endorser (Endorser 2 in the description below).

The following notation is used herein, e.g., to describe various embodiments:

X|Y indicates the concatenation of values X and Y. The ordering of concatenation must be the same across iterations of the protocol, in various embodiments, but is otherwise insignificant.

H(X) indicates the cryptographic hash of value X.

S(K, X) indicates an asymmetric signature over value X with the private component of key pair K as the signing key. Both X and the resulting signature block are included in the output. If X itself contains an asymmetric key pair, then the operation applies only to the public component of such a key.

In various embodiments, a Client obtains anonymized (e.g., hashed) identity information from some entity that holds such information (sometimes referred to herein as "Endorser 0"). The information is then successively passed through n additional Endorsers, each of which performs a one-way transform on it in combination with other values. In some embodiments, n=2. The final result is passed to the Service Provider, who uses it to look up the Client's history with that Service Provider, if any. For example, the Service Provider uses the final result to determine whether the Client has registered an account previously with that same Service Provider, or if instead the registration is a first-time registration.

In various embodiments, each Endorser in the chain knows its own inputs and outputs, but cannot correlate those values to any other values external to itself. It is therefore impossible to discover the identity of the Client as it presents itself to the Service Provider unless all Endorsers collude.

FIG. 1 is a flow diagram illustrating an embodiment of a process to register an account via a process that provides enforceable pseudonymous reputation across service accounts for the same user and service. In various embodiments, the process 100 of FIG. 1 may be performed by a Client participating in a process as disclosed herein, such as to register the Client with a Service Provider. In the example shown, at 102, the Client obtains anonymized identity information from a root endorser. For example, the root endorser may possess of have access to Personal Identifying Information of the Client, such as one or more of the Client's name; birth date; Social Security Number, passport number, driver's license number, or other government issued unique identifier; or other information that identifies the Client as being (or being associated with) a unique individual (or other unique user) but which the Client may not wish to share with one or more of subsequent Endorsers in the chain and a Service Provider with respect to which the process 100 is being performed. The information may be "anonymized" by the root Endorser by combining the Client's Personal Identifying Information with a secret data of the root Endorser, such as by concatenation, and transforming the result, such as by computing a hash of the result.

At 104, the Client passes information through a chain of Endorsers that includes n additional Endorsers, i.e., in addition to the root Endorser from which anonymized identity information was obtained at 102. In various embodiments, the Client sends to each Endorser a transformed Client identity data as received from the previous Endorser in the chain and the receiving Endorser further transforms the transformed Client identity data, such as by concatenating the data as received from the Client with its own secret data and hashing the result, then returning the further-transformed result to the Client.

In various embodiments, the endorsement chain comprises a repeatable sequence of n endorsers that is the same no matter how many times a given Client seeks to register with a given Service Provider. In some embodiments, the Client may retrieve publicly-available information from or about the Service Provider, which specifies the Service Provider's requirements with respect to register (or re-register) an account via chained endorsers, as disclosed herein. For example, the number, identification, and sequence of endorsers (or endorser types) to be included in the chain may be specified.

At 106, the Client provides to a Service Provider, e.g., a Service Provider with which the Client is performing the process of FIG. 1 to register or re-register an account, the result received from the final Endorser of the chain.

Figure 2:
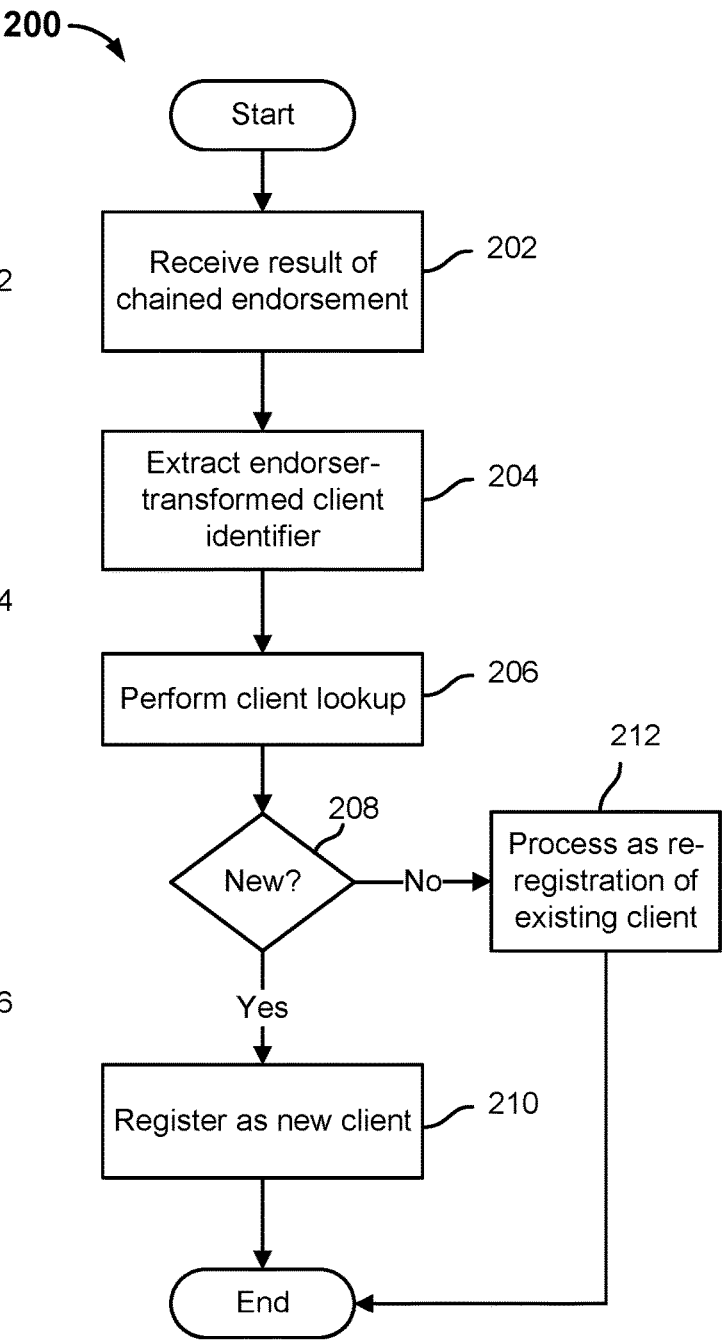
FIG. 2 is a block diagram illustrating an embodiment of a process to register an account via a process that provides enforceable pseudonymous reputation across service accounts for the same user and service.

FIG. 2 is a block diagram illustrating an embodiment of a process to register an account via a process that provides enforceable pseudonymous reputation across service accounts for the same user and service. In various embodiments, the process 200 of FIG. 2 may be performed by a Service Provider participating in a process as disclosed herein, such as to register a Client with the Service Provider. In the example shown, at 202, the Service Provider receives a result of a chained endorsement, e.g., the result provided at 106 of process 100 of FIG. 1. At 204, the Service Provider extracts endorser-transformed client identity data from the result received at 202, and at 206 the Service Provider uses the endorser-transformed client identity data to perform a lookup to determine if the same Client has registered previously with the Service Provider. If, at 208, the Client is determined to be a new client, i.e., the lookup found no existing or prior client with the same identity, then at 210 the Client is registered as a new client. If, instead, it is determined at 208 that the Client is not a new client, i.e., an account with the same Client identity was found at 206, then at 212 the registration request is processed as a re-registration of an existing client. For example, at 212, the Service Provider may respond to inform the client that an existing (or previously-existing) account of the Client was found and may offer the Client options to reclaim or renew the existing account.

Figures 3A, 3B, 3C:
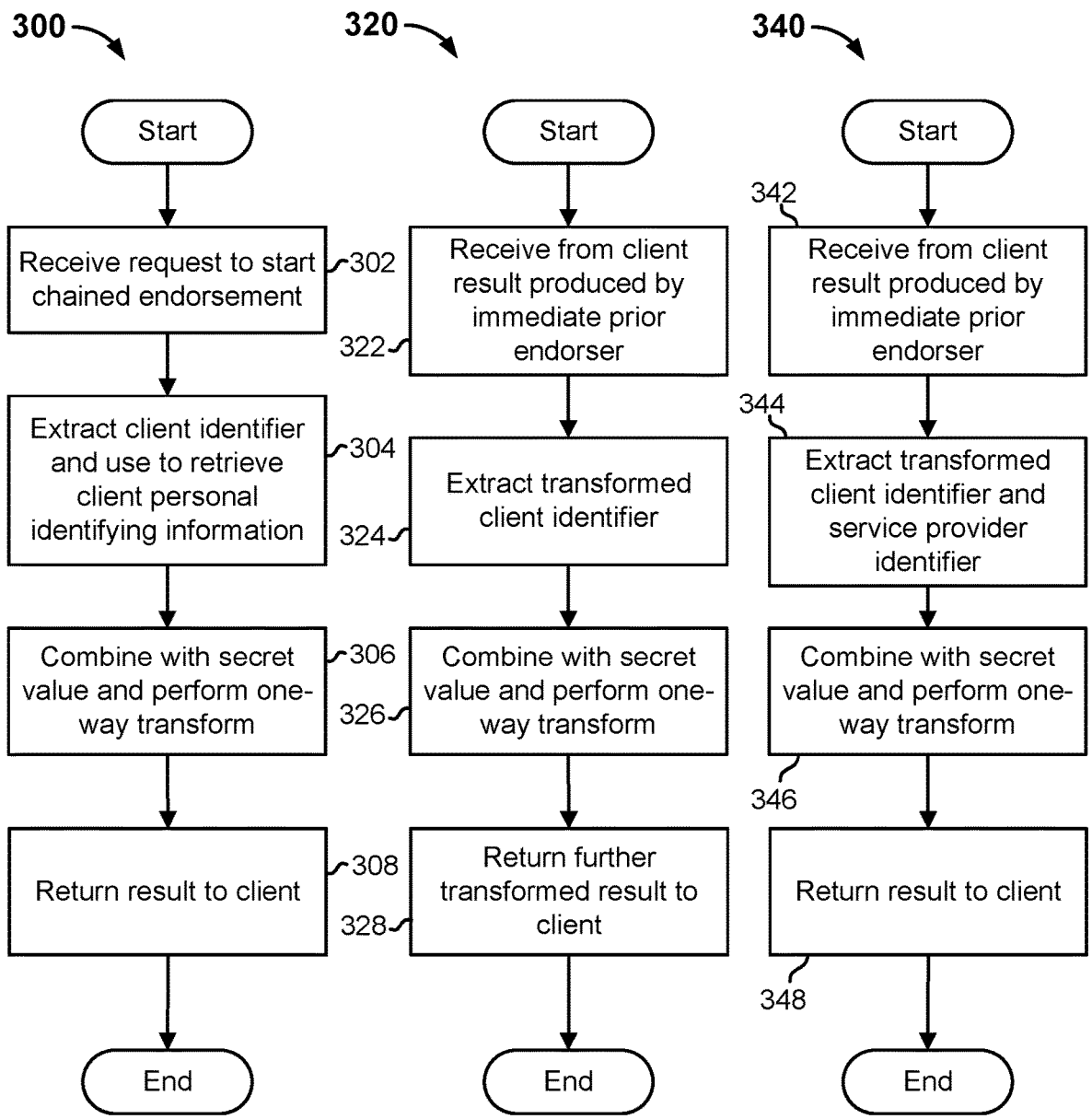
FIG. 3A is a block diagram illustrating an embodiment of a process to participate as an endorser in a registration process that provides enforceable pseudonymous reputation across service accounts for the same user and service.
FIG. 3B is a block diagram illustrating an embodiment of a process to participate as an endorser in a registration process that provides enforceable pseudonymous reputation across service accounts for the same user and service.
FIG. 3C is a block diagram illustrating an embodiment of a process to participate as an endorser in a registration process that provides enforceable pseudonymous reputation across service accounts for the same user and service.

FIG. 3A is a block diagram illustrating an embodiment of a process to participate as an endorser in a registration process that provides enforceable pseudonymous reputation across service accounts for the same user and service. In various embodiments, the process 300 of FIG. 3A may be performed by a root Endorser (e.g., "Endorser 0") participating in a process as disclosed herein, such as to register a Client with a Service Provider. In the example shown, at 302, the root Endorser receives a request to start a chained endorsement. At 304, a client identifier is extracted from the request received at 302 and is used to retrieve Personal Identifying Information of the Client. In this way, the Client does not need to send Personal Identifying Information to the root Endorser. At 306, the root Endorser combines the Client's Personal Identifying Information retrieved at 304 with a secret value (of the root Endorser) and performs a one-way transform on the result, such as a hash. At 308, the result obtained at 306 is sent to the Client.

FIG. 3B is a block diagram illustrating an embodiment of a process to participate as an endorser in a registration process that provides enforceable pseudonymous reputation across service accounts for the same user and service. In various embodiments, the process 320 of FIG. 3B may be performed by an intermediate (i.e., neither root nor final) Endorser participating in a process as disclosed herein, such as to register a Client with a Service Provider. In the example shown, at 322, the intermediate Endorser receives from the Client a result produced by an immediate prior Endorser in the chain, such as the root Endorser or an immediately prior intermediate Endorser. For example, for the first additional (intermediate) Endorser in the chain, the result (value) received at 322 may be the result returned to the Client by the root Endorsers, such as the result returned at 308 of FIG. 3A.

At 324, the intermediate Endorser extracts anonymized client identity information, e.g., the Client's Personal Identifying Information as transformed by each Endorser prior to the current Endorser in the chain, from the data received at 322. At 326, the value extracted at 324 is combined with a secret value of the current Endorser and a one-way transform (e.g., hash) is performed. At 328, a result of the processing performed at 326 is returned to the Client.

FIG. 3C is a block diagram illustrating an embodiment of a process to participate as an endorser in a registration process that provides enforceable pseudonymous reputation across service accounts for the same user and service. In various embodiments, the process 340 of FIG. 3C may be performed by a final Endorser participating in a process as disclosed herein, such as to register a Client with a Service Provider. In the example shown, at 342, the final Endorser receives from the requesting Client a result produced by the immediately prior (i.e., penultimate) Endorser in the chain. At 344, the final Endorser extracts anonymized client identity information, e.g., the Client's Personal Identifying Information as transformed by each Endorser prior to the final Endorser in the chain, and a Service Provider identifier from the data received at 342. In various embodiments, the Service Provider identifier is included to produce a result from the final Endorser that is specific to the Client with respect to this Service Provider. At 346, the values extracted at 344 are combined with a secret value of the final Endorser and a one-way transform (e.g., hash) is performed. At 348, a result of the processing performed at 346 is returned to the Client.

In various embodiments, the Client is configured to send to the Service Provider the result returned to the Client at 348, e.g., as in 106 of FIG. 1.

Figure 4:
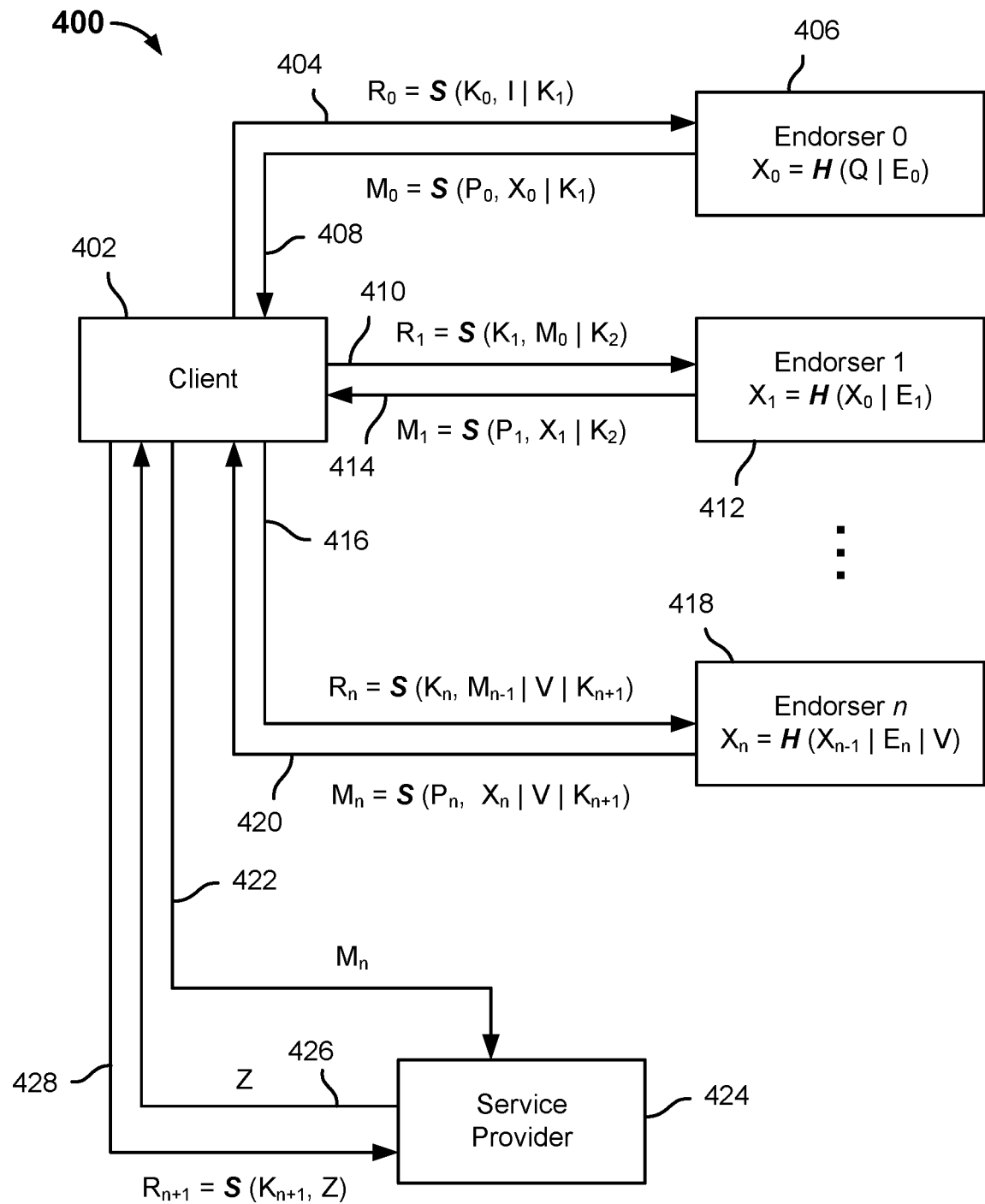
FIG. 4 is a functional flow diagram illustrating an embodiment of a system and process to register an account while providing enforceable pseudonymous reputation across service accounts for the same user and service.

FIG. 4 is a functional flow diagram illustrating an embodiment of a system and process to register an account while providing enforceable pseudonymous reputation across service accounts for the same user and service.

In various embodiments, protocol messages are transmitted over a suitable, secrecy-preserving and server-authenticating channel, such as TLS.

Referring to the example shown in FIG. 4, a process and system as disclosed herein operates as follows, in various embodiments:

1. Client 402 generates the first temporary asymmetric key pair $K_1$ and computes $$R_0 = S(K_0, I | K_1)$$

where I is the client's identifier and $K_0$ is the Client's persistent asymmetric key pair, then sends $R_0$ (404) to Endorser 0 (406).

2. Endorser 0 uses I to retrieve the public component of $K_0$ from its database and verifies the signature on $R_0$. If verification fails, the protocol stops.

3. Endorser 0 retrieves the Client's Personal Identifying Information Q and computes $$X_0 = H(Q | E_0)$$

where $E_0$ is Endorser 0's permanent secret value. Endorser 0 then computes $$M_0 = S(P_0, X_0 | K_1)$$

where $P_0$ is Endorser 0's asymmetric key pair and sends $M_0$ (408) to the Client.

4. Client 402 extracts $X_0$ from $M_0$ and generates the second temporary asymmetric key pair $K_2$. Client computes $$R_1 = S(K_1, M_0 | K_2)$$

and sends $R_1$ (410) to Endorser 1 (412).

5. Endorser 1 verifies the signature in $M_0$ against the public component of Endorser 0's key pair $P_0$. If verification fails, the protocol stops.

6. Endorser 1 verifies the signature in $R_1$ against $K_1$ (extracted from $M_0$). If verification fails, the protocol stops.

7. Endorser 1 computes $$X_1 = H(X_0 | E_1)$$

where $E_1$ is Endorser 1's permanent secret value; and $$M_1 = S(P_1, X_1 | K_2)$$

where $P_1$ is Endorser 1's asymmetric key pair and sends $M_1$ (414) to the Client.

8. For each additional intermediate Endorser, if any, Client 402 similarly composes a corresponding $R_1$, sends it to the intermediate Endorser, and receives a corresponding Mi in response.

9. Client extracts $X_{n-1}$ from $M_{n-1}$ received from the penultimate (i.e., final intermediate) Endorser, then generates the asymmetric key pair $K_{n+1}$. This pair may either be discarded after completion of the protocol or retained as a persistent service key. Client 402 computes $$R_n = S(K_n, M_{n-1} | V | K_{n+1})$$

where V is the Service Provider's unique public identifier, then sends $R_n$ (416) to Endorser n (418), the final Endorser in the chain.

10. Endorser n verifies the signature in $M_{n-1}$ against the public component of penultimate Endorser n−1's key pair $P_{n-1}$. If verification fails, the protocol stops.

11. Endorser n verifies the signature in $R_n$ against $K_n$ (extracted from $M_{n-1}$). If verification fails, the protocol stops.

12. Endorser n computes $$X_n = H(X_{n-1} | E_n | V)$$

where $E_n$ is Endorser n's permanent secret value; and $$M_n = S(P_n, X_n | V | K_{n+1}),$$

where $P_n$ is Endorser n's asymmetric key pair, and sends $M_n$ (420) to the Client.

13. Client 402 sends $M_n$ (422) to the Service Provider (424).

14. Service Provider 424 verifies Endorser n's signature in $M_n$. If verification fails, the protocol stops.
15. Service Provider verifies that the value V (extracted from $M_n$) is indeed the Service Provider's own public identifier. If verification fails, the protocol stops.
16. Service Provider generates a random nonce Z and sends it (426) to the Client.
17. Client computes $$R_{n+1} = S(K_{n+1}, Z)$$

and sends $R_{n+1}$ (428) to the Service Provider (424).
18. Service Provider verifies the Client's signature (with key $K_{n+1}$) in $R_{n+1}$. If verification fails, the protocol stops. Otherwise, the Service Provider has now established the Client's ownership of both $K_{n-1}$ and $X_n$.
19. Service Provider extracts $X_n$ (the Client's Registration Identifier) from $M_n$ and looks it up in the Service Provider's database. If found, Service Provider performs actions appropriate to re-registration of an existing account; otherwise, Service Provider stores $X_n$ and performs actions appropriate to a new registration with $X_n$ as the Registration Identifier.

In various embodiments, since the Client's identity can only be discovered by collusion of all Endorsers, the number of Endorsers in the system serves as a security parameter. In some embodiments, a system administrator, system implementer, software developer, or other authorized and qualified person or persons configure and/or implement a process and system as disclosed herein to include a desired number of Endorsers in the chain, depending on the desired level of security and other considerations (cost, latency, etc.), the level of security and likelihood (risk) of collusion among Endorsers decreasing, generally, as the number of Endorsers in the chain increases.

In various embodiments, a system as disclosed herein may be implemented with just two Endorsers (number of additional Endorsers n=1), or with any number greater than two. In various embodiments, the final Endorser performs the protocol analogously to Endorser n in the description above, and an intermediate Endorser performs the protocol analogously to Endorser 1. Thus, an intermediate Endorser i receives $$R_i = S(K_i, M_{i-1} | K_{i+1})$$

from the Client, then computes $$X_i = H(X_{i-1} | E_i)$$

where $E_i$ is the Endorser's permanent secret value, and $$R_n = S(P_i, X_i | K_{i+1})$$

where $P_i$ is the Endorser's asymmetric key pair, and sends $M_i$ to the Client. Similarly, the final Endorser (Endorser n) receives $$R_n = S(K_n, M_{n-1} | V | K_{n+1})$$

from the Client, then computes $$X_n = H(X_{n-1} | E_n | V)$$

and $$M_n = S(P_n, X_n | V | K_{n+1})$$

and sends $M_n$ to the Client.

In various embodiments, techniques disclosed herein may be used to provide enforceable pseudonymous reputation through chained endorsers. A Client may register or re-register with a Service Provider without disclosing Personal Identifying Information of the Client. A Service Provider can readily and reliably identify a registration request as being from a new Client or a Client that has been registered previously and can process the request accordingly. Clients who behave badly or otherwise earn a negative reputation with respect to a Service Provider can be prevented from simply re-registering, e.g., using a fictitious name and a different email address, for example, enabling the Service Provider and its other users to consider the Client's previously-generated reputation information in their dealings with the Client.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a communication interface; and
 one or more hardware processors coupled to the communication interface and configured to:
  receive via the communication interface a request associated with a chained endorsement operation;
  extract from the request a client identity information included in the request;
  combine data associated with the client identity information with a secret value;
  perform a one-way transform of the combined value; and
  return a result of the one-way transform to a client with which the chained endorsement operation is associated,
  wherein the request associated with a chained endorsement operation is received from a client configured to:
   iteratively send a request associated with the chained endorsement operation to each of a sequence of endorsers comprising a chain of endorsers associated with the chained endorsement operation;
   receive a final result from a final endorser in the chain; and
   send the final result to a service provider in connection with a request to register an account with the service provider.

2. The system of claim 1, wherein the client identity information comprises a client identifier and the one or more hardware processors are further configured to use the client identity information to retrieve personal identifying information of the client.

3. The system of claim 1, wherein the client identity information comprises an intermediate result generated by an immediate previous endorser in a chain of endorsers with which the chained endorsement operation is associated.

4. The system of claim 1, wherein the one or more hardware processors are configured to combine the data comprising or associated with the client identity information with the secret value by concatenating values for the data and the secret value in a canonical order.

5. The system of claim 1, wherein the one-way transform comprises a hash function.

6. The system of claim 1, wherein the final result includes a final transformed client identity information as transformed by the final endorser in the chain.

7. The system of claim 6, wherein the final transformed client identity information is unique to the client at least with respect to that service provider.

8. The system of claim 7, wherein the service provider is configured to use the final transformed client identity information to perform a lookup to determine whether the client is a new client.

9. The system of claim 8, wherein the service provider is configured to process a registration request as a re-registration of the account registered previously by the same client based at least in part on a determination the client is not a new client.

10. The system of claim 1, wherein the final transformed client identity information does not disclose a personal identifying information of the client.

11. The system of claim 10, wherein the final transformed client identity information cannot be used by the service provider or the final endorser to obtain the personal identifying information of the client.

12. A method, comprising:
receiving via a communication interface a request associated with a chained endorsement operation;
extracting from the request a client identity information included in the request;
combining data associated with the client identity information with a secret value;
performing a one-way transform of the combined value; and
returning a result of the one-way transform to a client with which the chained endorsement operation is associated;
wherein the request associated with a chained endorsement operation is received from a client configured to:
iteratively send a request associated with the chained endorsement operation to each of a sequence of endorsers comprising a chain of endorsers associated with the chained endorsement operation;
receive a final result from a final endorser in the chain; and
send the final result to a service provider in connection with a request to register an account with the service provider.

13. The method of claim 12, wherein the client identity information comprises a client identifier and the method further includes using the client identity information to retrieve personal identifying information of the client.

14. The method of claim 12, wherein the client identity information comprises an intermediate result generated by an immediate previous endorser in a chain of endorsers with which the chained endorsement operation is associated.

15. The method of claim 12, wherein the final result includes a final transformed client identity information as transformed by the final endorser in the chain; the final transformed client identity information is unique to the client at least with respect to that service provider; and the service provider is configured to use the final transformed client identity information to perform a lookup to determine whether the client is a new client.

16. The method of claim 12, wherein the final transformed client identity information does not disclose a personal identifying information of the client.

17. The method of claim 12, wherein a service provider uses the client identity information to restrict creation of an account for a client associated with the client identity if the service provider has a pre-existing account associated with the client identity information.

18. The method of claim 17, wherein the client identity information is generated using the chained endorsement operation based at least in part on an immutable, globally unique value associated with the client.

19. A computer program product embodied in a non-transitory computer readable medium, comprising computer instructions for:
receiving via a communication interface a request associated with a chained endorsement operation;
extracting from the request a client identity information included in the request;
combining data associated with the client identity information with a secret value;
performing a one-way transform of the combined value; and
returning a result of the one-way transform to a client with which the chained endorsement operation is associated;
wherein the request associated with a chained endorsement operation is received from a client configured to:
iteratively send a request associated with the chained endorsement operation to each of a sequence of endorsers comprising a chain of endorsers associated with the chained endorsement operation;
receive a final result from a final endorser in the chain; and
send the final result to a service provider in connection with a request to register an account with the service provider.

* * * * *